United States Patent
Jadhav et al.

(10) Patent No.: US 11,888,712 B1
(45) Date of Patent: Jan. 30, 2024

(54) SYSTEM AND METHODS TO EFFECTIVELY ROUTE TRAFFIC AND PROACTIVELY SCALE INFRA IN THE PARTNER REGION

(71) Applicant: NICE LTD., Ra'anana (IL)

(72) Inventors: Chaitalee Jadhav, Pune (IN); Pranav Modi, South Jordan, UT (US); Seemit Shah, Pune (IN); Sharayu Ethape, Pune (IN); Sunny Deo, Ranchi (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 18/311,284

(22) Filed: May 3, 2023

(51) Int. Cl.
*H04L 41/5067* (2022.01)
*G06Q 30/01* (2023.01)
*H04L 43/04* (2022.01)
*H04L 47/2425* (2022.01)
*H04L 41/5009* (2022.01)
(Continued)

(52) U.S. Cl.
CPC ......... *H04L 41/5067* (2013.01); *G06Q 30/01* (2013.01); *H04L 41/5009* (2013.01); *H04L 41/5025* (2013.01); *H04L 43/04* (2013.01); *H04L 45/308* (2013.01); *H04L 47/2425* (2013.01)

(58) Field of Classification Search
CPC ............. H04L 41/5067; H04L 41/5009; H04L 41/5025; H04L 43/04; H04L 47/2425; G06Q 30/01
See application file for complete search history.

(56) References Cited

U.S. PATENT DOCUMENTS

| | | | |
|---|---|---|---|
| 2017/0026301 A1* | 1/2017 | Keller | H04L 47/621 |
| 2021/0157692 A1* | 5/2021 | MacCarthaigh | G06F 11/0757 |
| 2021/0306205 A1* | 9/2021 | MacCarthaigh | G06F 11/2025 |

(Continued)

FOREIGN PATENT DOCUMENTS

WO  WO-2017127225 A1 *  7/2017  ......... G06F 9/45558

OTHER PUBLICATIONS

W. Myers, "Taking the Plunge: A Field Guide to Going Multi-Region," Button Blog, Mar. 25, 2021. https://blog.usebutton.com/taking-the-plunge-a-field-guide-to-going-multi-region.

(Continued)

*Primary Examiner* — Philip C Lee
(74) *Attorney, Agent, or Firm* — Haynes and Boone, LLP

(57) ABSTRACT

Traffic routing and infrastructure scaling systems and methods, and non-transitory computer readable media, including receiving, by a primary region, incoming customer requests; determining, by a traffic control module, a traffic redirect quotient (TRQ) and a regional scale quotient (RSQ), wherein the TRQ indicates a percentage of the incoming customer requests needed to be redirected to a secondary partner region and the RSQ indicates a percentage of infrastructure scaling needed in the secondary partner region; receiving, by a recommendation processing module, the TRQ and the RSQ; automatically initiating, by the recommendation processing module, redirection of the percentage of the incoming customer requests indicated by the TRQ to the secondary partner region, scaling the percentage of infrastructure indicated by the RSQ in the secondary partner region, or both; and routing, by a network traffic manager service, the percentage of the incoming customer requests indicated by the TRQ to the secondary partner region.

20 Claims, 12 Drawing Sheets

100

(51) Int. Cl.
    *H04L 41/5025*     (2022.01)
    *H04L 45/302*     (2022.01)

(56) References Cited

U.S. PATENT DOCUMENTS

| | | | | |
|---|---|---|---|---|
| 2022/0166691 A1* | 5/2022 | Johnson | ............... | H04L 43/0894 |
| 2022/0286517 A1* | 9/2022 | Wood | ................... | H04L 41/147 |
| 2023/0344770 A1* | 10/2023 | Kadam | ............... | H04L 63/0218 |

OTHER PUBLICATIONS

A.C. Clarke, "How to build a multi-region active-active architecture on AWS," A Cloud Guru News, Jul. 15, 2022. https://acloudguru.com/blog/engineering/why-and-how-do-we-build-a-multi-region-active-active-architecture.

M. Goldman, "5 reasons to build multi-region application architecture," Cockroach Labs, Sep. 1, 2022. https://www.cockroachlabs.com/blog/5-reasons-to-build-multi-region-application-architecture/.

Amazon Web Service, Inc. (or affiliate), "5 9s (99.999%) or higher scenario with a recovery time under one minute," 2023. https://docs.aws.amazon.com/wellarchitected/latest/reliability-pillar/s-99.999-or-higher-scenario-with-a-recovery-time-under-1-minute.html.

* cited by examiner

FIG. 9

| CriticalError Count | HealthCheck Failed | AutoScale Used% | CPU Used% | Memory Used% | Network Used% | TrafficBreach% | TRQ | Scenario |
|---|---|---|---|---|---|---|---|---|
| 1 | FALSE | ANY | ANY | ANY | ANY | 0 | 100% | Any critical error trigger 100% traffic redirect |
| 0 | TRUE | ANY | ANY | ANY | ANY | 0 | 100% | Any HealthCheck failure trigger 100% traffic redirect |
| 0 | FALSE | 100% | 100% | ANY | ANY | 0 | 100% | Autoscale capacity reached and CPU threshold reached |
| 0 | FALSE | 100% | ANY | 100 | ANY | 0 | 100% | Autoscale capacity reached and MemoryUsed 100 |
| 0 | FALSE | 100% | ANY | ANY | 100 | 0 | 100% | Autoscale capacity reached and NetworkUsed 100% |
| 0 | FALSE | ANY | ANY | ANY | ANY | 20% | 20% | High traffic |
| 0 | FALSE | <100 | 100 | ANY | ANY | 0% | 0% | Autoscaling will take care of CPU usage. Traffic redirection not needed |

FIG. 10

| Application Breach Indicator (ABI) | | Infrastructure Breach Indicator (IBI) | | | | | Traffic Breach Indicator (TBI) | | | |
|---|---|---|---|---|---|---|---|---|---|---|
| Critical Error Count | Leading Error% | Health Check Failed | Auto Scale Used% | CPU Used% | Memory Used% | Network Used% | TrafficBreach % | Minimum Scale% | RSQ | Potential Actions |
| 0 | 5% | FALSE | 10% | 20% | 40% | 80% | 0% | 30% | 30% | Minimum Scale capacity take precedence as everything normal |
| 0 | 50% | FALSE | 10% | 20% | 40% | 80% | 0% | 30% | 50% | Leading error higher than configured minimum scale % |
| 0 | 50% | FALSE | 60% | 20% | 40% | 80% | 0% | 30% | 60% | Autoscaling infra is higher (But didn't cross the threshold) than other factors including LeadingError% |
| 0 | 5% | FALSE | 72% | 80% | 40% | 50% | 0% | 30% | 80% | Auto scaling cross threshold of 70% so CPUUsed% take preference |
| 0 | 5% | FALSE | 72% | 80% | 40% | 90% | 0% | 30% | 90% | Auto scaling cross threshold of 70% so CPUUsed% take preference |
| 1 | 5% | FALSE | 10% | 20% | 40% | 80% | 0% | 30% | 100% | Critical Error. Scale 100% infra |
| 1 | 5% | TRUE | 10% | 20% | 40% | 80% | 0% | 30% | 100% | Healthcheck failed. Sacle 100% infra |

FIG. 11

SYSTEM AND METHODS TO EFFECTIVELY ROUTE TRAFFIC AND PROACTIVELY SCALE INFRA IN THE PARTNER REGION

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The present disclosure relates generally to methods and systems for routing incoming customer requests and scaling infrastructure, and more particularly to methods and systems that proactively route customer traffic to a partner region and effectively control scale up/scale down of infrastructure of the partner region.

BACKGROUND

In a contact center, high uptime is essential for many applications because it directly translates into customer satisfaction. Uptime is a metric that is used to understand a system's overall reliability. Outages in critical functionalities, such as logins and application programming interface (API) gateways, can have cascading impacts and impact an entire suite along with customer satisfaction. Moreover, outages directly translate into breaches of committed service level agreements (SLA) for a suite and possible financial loss. The three major principles of achieving high uptime are elimination of single-point-of-failure, reliable crossover or failover points, and failure detection capabilities.

Multi-region redundancy is the most effective strategy in achieving the above-mentioned principals and provides up to 99.999% uptime for cloud applications. 99.999% uptime means an average of fewer than 6 minutes of downtime per year. Cross-region failover provides fault tolerance and protects applications from regional failovers. None of the individual cloud services (e.g., Amazon Web Service EC2 or Amazon Web Service S3) in the same region provides 99.999% uptime. Regional outages of cloud services are very common because of underlying architectures.

Multi-region architecture, however, has the following challenges. Outages in the primary region must be identified quickly. A way to route entire or partial customer traffic to the secondary region must be automated since manual routing is too slow. Possible traffic distribution in the region must be predicted. Secondary region infrastructure must also be scaled in a cost-effective way.

Traditional solutions redirect 100% of traffic to partner regions in cases of outages in primary regions by looking at health check endpoints of service. The common practice is to keep infrastructure fully scaled up in partner regions (which doubles infrastructure cost), or to begin infrastructure scaling after traffic failover (which can add an additional delay before the partner region can start accepting customer traffic).

Accordingly, a need exists for improved systems and methods for routing customer traffic and infrastructure scaling.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 9 illustrates an exemplary user interface that accepts default configurations for the infrastructure breach indicator (IBI) module according to embodiments of the present disclosure.

FIG. 10 illustrates TRQ results of a simulation according to embodiments of the present disclosure.

FIG. 11 illustrates RSQ results of a simulation according to embodiments of the present disclosure.

DETAILED DESCRIPTION

Figure 1:
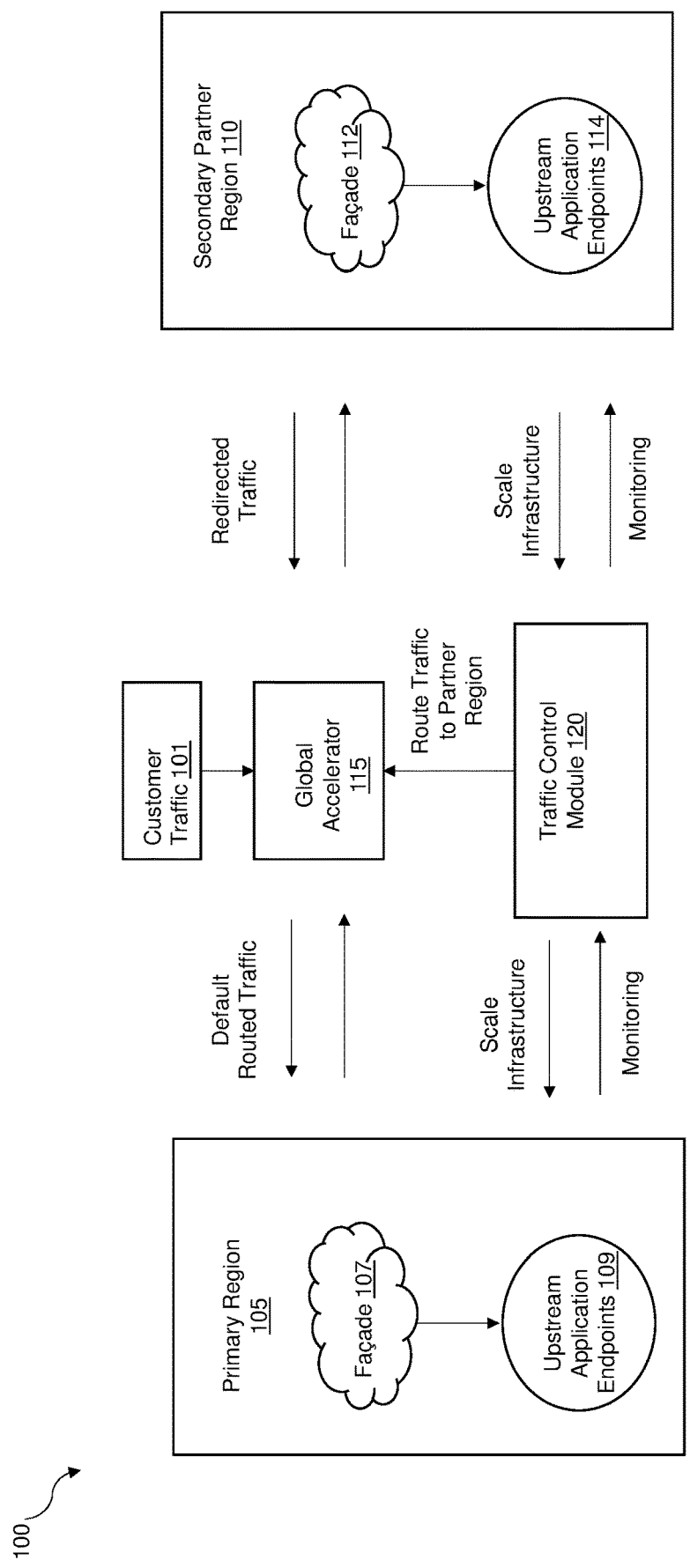
FIG. 1 is a simplified diagram of a system according to embodiments of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present systems and methods protect customers from system-wide outages by helping proactively route customer traffic to partner regions. In one or more embodiments, the present systems and methods also provide a comprehensive traffic routing algorithm that factors in various infrastructure metrics, traffic metrics, and application health metrics. Moreover, the present systems and methods help manage infrastructure costs of a partner region (also referred to herein as a secondary partner region) via effectively controlling scale up/scale down of the partner region based on risk indicators. In some embodiments, the present systems and methods provide a comprehensive algorithm to route customer traffic to partner regions.

In various embodiments, a traffic control (TC) module is used to monitor various aspects of the primary region to identify the system instability that an application can use to take actions to avoid catastrophic situations and downtime impacting five nine SLAs. The TC module is an algorithmic module deployed in the partner region that considers various breaches in the system and determines how much the system stability is compromised. It decides the percentage of incoming traffic to be redirected to the partner region to help bring in much-needed stability. It can also indicate the amount of infrastructure needs to be scaled in the secondary partner region based on various risk indicators. The TC module is responsible for scaling the partner region infrastructure based on risk indicators in the primary region, and redirecting a percentage of customer traffic or all the customer traffic to the secondary partner region based on the health of the primary region. In some embodiments, the TC module identifies any small disturbance in the primary region and gracefully starts diverting customer traffic to the secondary partner region. This not only provides instant failover, but also protects the primary region from catastrophic failure. The TC module provides smart scaling of partner region infrastructure, which can advantageously save significant cost such as in standby equipment requirements.

In several embodiments, the TC module calculates two quotients. The traffic redirect quotient (TRQ) indicates the percentage of traffic that needs to be redirected to the partner region. The TRQ is calculated based on various application, infrastructure, and traffic metrics as further described herein. This quotient is used by the recommendation processing (RP) module to smartly route traffic into the partner region.

The regional scale quotient (RSQ) indicates the amount of infrastructure scaling needed in the partner region. RSQ is calculated based on various risk factors in the primary region. The objective here is to scale enough infrastructure in the partner region to handle any possible incoming traffic. This helps to scale more infrastructure while the risk is high for possible traffic distribution in the primary region.

The present systems and methods calculate the TRQ and the RSQ, based on the output of various breach indicators from the following three modules: application breach indicator (ABI) module, infrastructure breach indicator (IBI) module, and incoming traffic breach indicator (ITBI) module. In one or more embodiments, the input provided to these modules are those shown below in Table 1, and the output of these modules are those shown below in Table 2.

TABLE 1

INPUT TO MODULES

| Metric | Definition |
| --- | --- |
| Critical Error Count | No of fatal errors reported by applications in 1 minute |
| Health Check | Health check per instance |
| Leading error count | Count of leading errors |
| inComing NetworkGB | Current incoming traffic in gigabytes (GB) per instances |
| CurrentInstance Count | Count of current running instances |
| CurrentCPU | Central processing unit (CPU) usage in current instance |
| CurrentMemory | Memory usage in current instance |
| CurrentNetwork | Incoming traffic usage in current instance |

TABLE 2

OUTPUT OF MODULES

| Indicator | Definition |
| --- | --- |
| LeadingErrors % | % of leading errors compared to certified leading errors |
| HealthCheckFailed | Health check API returned failure per instance |
| TrafficBreach % | Current incoming traffic in GB per instances |
| AutoScaleUsed % | % of infrastructure already auto scaled from its Certified Auto scale Count |
| CPUUsed % | % of CPU used compared to certified CPU usage (per instance) |
| MemoryUsed % | % of memory used compared to certified memory usage (per instance) |
| NetworkUsed % | % of network used compared to certified network usage (per instance) |

The TRQ and the RSQ are calculated based on the indicators in Table 2. The RP module interprets the TRQ and the RSQ to initiate automatic traffic redirect or infrastructure scaling in partner regions.

The comprehensive traffic redirect strategy of the present systems and methods has the following potential benefits: identifying instability with the cloud infrastructure deployed and starting the routing of traffic into partner regions, effectively using partner region infrastructure to handle a sudden spike in traffic, and identifying any abnormal patterns and proactively starting the redirecting of traffic to the secondary partner region to avoid catastrophic failure in an application.

The proactive scaling infrastructure of the present systems and methods has the following benefits. Companies do not have to provide or maintain fully scaled-up infrastructure in partner regions, which can double the infrastructure cost for the application. Keeping infrastructure ready is expensive and not keeping infrastructure will be more likely to result in longer duration outage(s), and the present disclosure helps minimize or avoid such costs and minimize or avoid the length of any such outages. RSQ provides a balanced way to scale infrastructure based on various risk factors. There is cost saving and the partner region is kept ready to accept the load for any eventuality.

FIG. 1 illustrates a block diagram of a system 100 according to various embodiments of the present disclosure. System 100 includes Primary Region 105, Secondary Partner Region 110, Global Accelerator 115, and TC Module 120. Customer Traffic 101 is routed via Global Accelerator 115 to Façade Gateway 107 that in turn routes traffic to appropriate microservice and/or automatic communication distributor (ACD) clusters.

Primary Region 105 includes Façade Gateway 107 and Upstream Application Endpoints 109. Primary Region 105 is the default active region where all customer traffic is initially routed. Secondary Partner Region 110 includes Façade Gateway 112 and Upstream Application Endpoints 114. Secondary Partner Region 110 is an active region that is ready to receive customer traffic when there are issues with Primary Region 105. Global Accelerator 115 acts as a network traffic manager service, and can be any scalable Domain Name System (DNS) server. TC Module 120 monitors various aspects of Primary Region 105 to calculate the TRQ and the RSQ as explained in further detail below.

Figure 2:
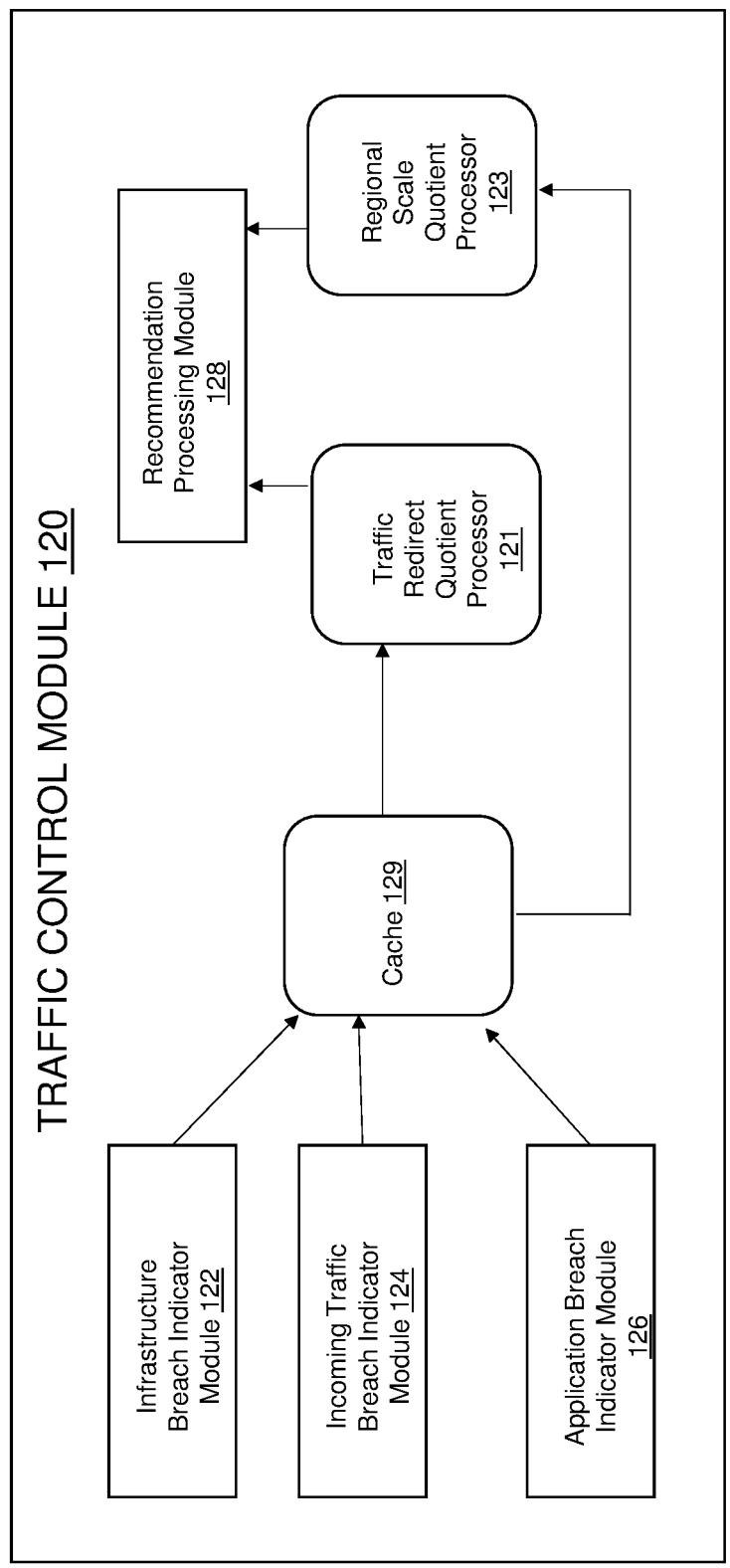
FIG. 2 is a diagram of the different components of a traffic control module according to embodiments of the present disclosure.

In FIG. 2, the different components of TC Module 120 are shown. In the exemplary embodiment shown, TC Module 120 includes Infrastructure Breach Indicator (IBI) Module 122, Incoming Traffic Breach Indicator (ITBI) Module 124, Application Breach Indicator (ABI) Module 126, Traffic Redirect Quotient (TRQ) Processor 121, Regional Scale Quotient (RSQ) Processor 123, Recommendation Processing (RP) Module 128, and Cache 129. IBI Module 122 collects all infrastructure-related metrics such as autoscaling capacity, CPU, memory, and network metrics. ITBI Module 124 keeps track of traffic patterns. ABI Module 126 keeps track of application-specific critical errors, leading errors, and health checks. TRQ Processor 121 calculates the TRQ from data provided by IBI Module 122, ITBI Module 124, and ABI Module 126. RSQ Processor 123 calculates the RSQ from data provided by IBI Module 122, ITBI Module 124, and ABI Module 126. RP Module 128 processes the TRQ and RSQ as input, and is responsible for triggering actual infrastructure change events and/or traffic redirection to balance the load of customer traffic without manual intervention. Cache 129 stores the information provided by IBI Module 122, ITBI Module 124, and ABI Module 126 that are used to calculate the TRQ and the RSQ.

As noted above, IBI Module 122 collects all infrastructure-related metrics such as autoscaling capacity, CPU, memory, and network metrics. Under the IBI Module 122, certain critical indicators are calculated and uploaded to Cache 129. The tables below show the input and output of IBI Module 122.

TABLE 3

INPUT TO IBI MODULE

| Field Name | Data Type | Purpose |
| --- | --- | --- |
| CurrentInstanceCount | Number | Count of current running instances |
| CertifiedAutoscaleCount | Number | Certified count of auto scaling instances |
| CurrentCPU | Number | CPU usage in current instance |
| CertifiedCPU | Number | Certified CPU usage at any given point in time |
| CurrentMemory | Number | Memory usage in current instance |
| CertifiedMemory | Number | Certified memory usage at any given point in time |
| CurrentNetwork | Number | Incoming traffic usage in current instance |
| CertifiedNetwork | Number | Certified incoming traffic usage at any given point in time |
| DateTime | DateTime | Date and Time when the IBI was modified |

TABLE 4

OUTPUT OF IBI MODULE

| Indicator | Data Type | Purpose |
| --- | --- | --- |
| AutoScaleUsed% | Number | % of infra already auto scaled from its Certified Auto scale Count |
| CPUUsed% | Number | % of CPU used compared to certified CPU usage (per instance) |
| MemoryUsed% | Number | % of memory used compared to certified memory usage (per instance) |
| NetworkUsed% | Number | % of network used compared to certified network usage (per instance) |

Table 5 below provides sample calculations of the AutoScaleUsed%, CPUUsed%, MemoryUsed%, and NetworkUsed% indicators.

TABLE 5

CALCULATION OF IBI CRITICAL INDICATORS

| | |
| --- | --- |
| AutoScaleUsed % = (CurrentInstanceCount/ CertifiedAutoscaleCount) * 100 | E.g. 10/10 * 100 = 100% (AutoScaleUsed % = 100) E.g. 6/10 * 100 = 60% (AutoScaleUsed % = 60) |
| CPUUsed % = (CurrentCPU/ CertifiedCPU) * 100 (In Percentage per instance capacity) | E.g. 90/80 * 100 = 112% (CPUUsed % = 112) E.g. 20/80 * 100 = 25% (CPUUsed % = 25) |
| MemoryUsed % = (CurrentMemory/ CertifiedMemory) * 100 (% of per instance capacity) | E.g. 70/60 * 100 = 116% (MemoryUsed % = 116%) E.g. 40/60 * 100 = 67% (MemoryUsed % = 67%) |
| NetworkUsed % = (CurrentNetwork/ CertifiedNetwork) * 100 (MegaByte per instance) | E.g. 12000/10,000 * 100 = 120 (NetworkUsed % = 120) E.g. 4000/10,000 * 100 = 40 (NetworkUsed% = 40) |

ITBI Module 124 keeps track of traffic patterns. Under ITBI Module 124, the critical indicator of TrafficBreach% is calculated and uploaded to Cache 129. The tables below show the input and output of ITBI Module 124, as well as sample calculations.

TABLE 6

INPUT TO ITBI MODULE

| Field Name | Data Type | Purpose |
| --- | --- | --- |
| inComingNetworkGB | Number | Current incoming traffic in GB per instances |
| CertifiedNetworkGB | Number | Certified incoming traffic in GB per instances |
| DateTime | Date Time | Date and time when the ITBI was modified |

TABLE 7

OUTPUT OF ITBI MODULE

| Indicator | Data Type | Purpose |
| --- | --- | --- |
| TrafficBreach % | Number | % of incoming traffic load breach compared to certified traffic load |

TABLE 8

CALCULATION OF ITBI CRITICAL INDICATOR

| | |
|---|---|
| TrafficBreach % = ((inComingNetworkGB/ CertifiedNetworkGB) × 100) | E.g. (1.6 GB/2.5 GB) × 100 = 64% (InfraBreach% = 64) E.g. (1.4 GB/2.5 GB) × 100 = 56% (InfraBeach% = 56) |

ABI Module 126 keeps track of application-specific critical errors, leading errors, and health checks. Under ABI Module 126, certain critical indicators are calculated and uploaded to Cache 129. The tables below show the input and the output of ABI Module 126, as well as sample calculations.

TABLE 9

INPUT TO ABI MODULE

| Field Name | Data Type | Purpose |
|---|---|---|
| CriticalErrorCount | Number | No. of fatal errors reported by applications in 1 minute |
| LeadingErrorsCount | Number | Count of leading errors |
| CertifiedLeadingErrors | Number | Certified Count of leading errors |
| HealthCheckFailed | Boolean | Health check API returned failure per instance |
| Date Time | DateTime | Date and time when the ABI was modified |

TABLE 10

OUTPUT OF ABI MODULE

| Indicator | Data Type | Purpose |
|---|---|---|
| CriticalErrorCount | Number | No of fatal errors reported by applications in 1 minute |
| LeadingErrors% | Number | % of leading errors compared to certified leading errors |
| HealthCheckFailed | Boolean | Health check API returned failure per instance |

TABLE 11

CALCULATION OF ABI CRITICAL INDICATORS

| | |
|---|---|
| CriticalErrorCount | No of fatal errors reported by applications in 1 minute E.g. Unable to connect to DB errors |
| LeadingErrors % = (LeadingErrorsCount/ CertifiedLeadingErrors) * 100 | E.g. 6000/5000 * 100 = 120 (LeadingErrors % = 120) E.g. 3000/5000 * 100 = 60 (LeadingErrors % = 60) |
| Health CheckFailed | Health check failed (Boolean value) E.g. True - Health check failed E.g. False - Health check passed |

TRQ Processor 121 takes the output of IBI Module 122, ITBI Module 124, and ABI Module 126, and calculates the TRQ, which indicates the percentage of traffic that needs to be redirected to Secondary Partner Region 110. TRQ is calculated based on various application, infrastructure, and traffic metrics stored in Cache 129. This quotient is used by RP Module 128 to intelligently route customer traffic to the Secondary Partner Region 110. In an exemplary embodiment, TRQ is calculated based on the formula below.

TrafficRedirectQuotient=100*
(CriticalErrorCount>1||HealthCheckFailed==true||

(AutoScaleLimit%>100 &&
(CPULimit%>100||NetworkLimit%>100||

MemoryLimit%>100))+TrafficBreach%

RSQ Processor 123 takes the output of IBI Module 122, ITBI Module 124, and ABI Module 126, and calculates the RSQ, which indicates the amount of infrastructure scaling needed in Secondary Partner Region 110. RSQ is calculated based on various risk factors in Primary Region 105. The objective is to scale enough infrastructure in Secondary Partner Region 110 to handle any possible incoming customer traffic. This helps to scale more infrastructure while the risk is high for possible customer traffic distribution in Primary Region 105. In an exemplary embodiment, RSQ Processor 123 is calculated based on the below table.

TABLE 12

CALCULATION OF RSQ

RegionalScaleQuotient (RSQ): =
MAX (

| | |
|---|---|
| MinimumScale %, | Minimum scaling capacity configuration |
| AutoScaleLimit % | Scale based on Autoscaling capacity reached |
| (AutoScaleLimit % > 50) * (CPULimit %) | If Auto scaling crosses threshold and CPU rising |
| (AutoScaleLimit % > 50) * (NetworkLimit %) | If Auto scaling crosses the threshold and Network rising |
| (AutoScaleLimit % > 50) * (MemoryLimit %) | If Auto scaling crosses the threshold and Memory rising |
| LeadingErrors%, | Leading errors highlighting risks in the primary region. Scale if the error count increases |
| 100 * (CriticalErrorCount >1), | 100% scale for any critical error |
| 100 * (HealthCheckFailed), | 100% scale for any health check failures. |
| TrafficBreached % | Scale based on traffic breach |

)

Once the TRQ and RSQ are calculated, they are sent to RP Module 128 as input. RP Module 128 transmits appropriate commands to either route a percent of customer traffic from Primary Region 105 to Secondary Partner Region 110, or instructs to scale the infrastructure in Secondary Partner Region 110 in anticipation. In the case of API Façade, RP Module 128 modifies the traffic dial of Global Accelerator 115, and modifies the load balancer to autoscale infrastructure in Secondary Partner Region 110. In some embodiments, RP Module 128 can wait for cumulative failures, a time period, or other deferral basis, before taking implementing any action(s). For example, RP Module 128 can wait for TRQ failure for two (2) subsequent minutes before triggering actual redirection.

Referring now to both FIGS. 1 and 2, Customer Traffic 101 comes in from within a demilitarized (DMZ) network or directly from customers into Primary Region 105. ABI, ITBI, and IBI metrics are calculated regularly and uploaded to Cache 129. Cache 129 maintains the various thresholds and current state of the overall infrastructure, and provides input to TRQ Processor 121 and RSQ Processor 123. TRQ and RSQ are calculated based on cached metric values, and are pushed to RP Module 128. Based on TRQ and RSQ, RP Module 128 transmits appropriate commands to either redirect the percentage of traffic to Secondary Partner Region 110, and/or transmits commands to scale infrastructure in Secondary Partner Region 110 in anticipation of customer traffic being routed to Secondary Partner Region 110. Global Accelerator 115 routes the percentage of customer traffic as per the RP Module 128 to either Primary Region 105 or Secondary Partner Region 110.

Figure 3:
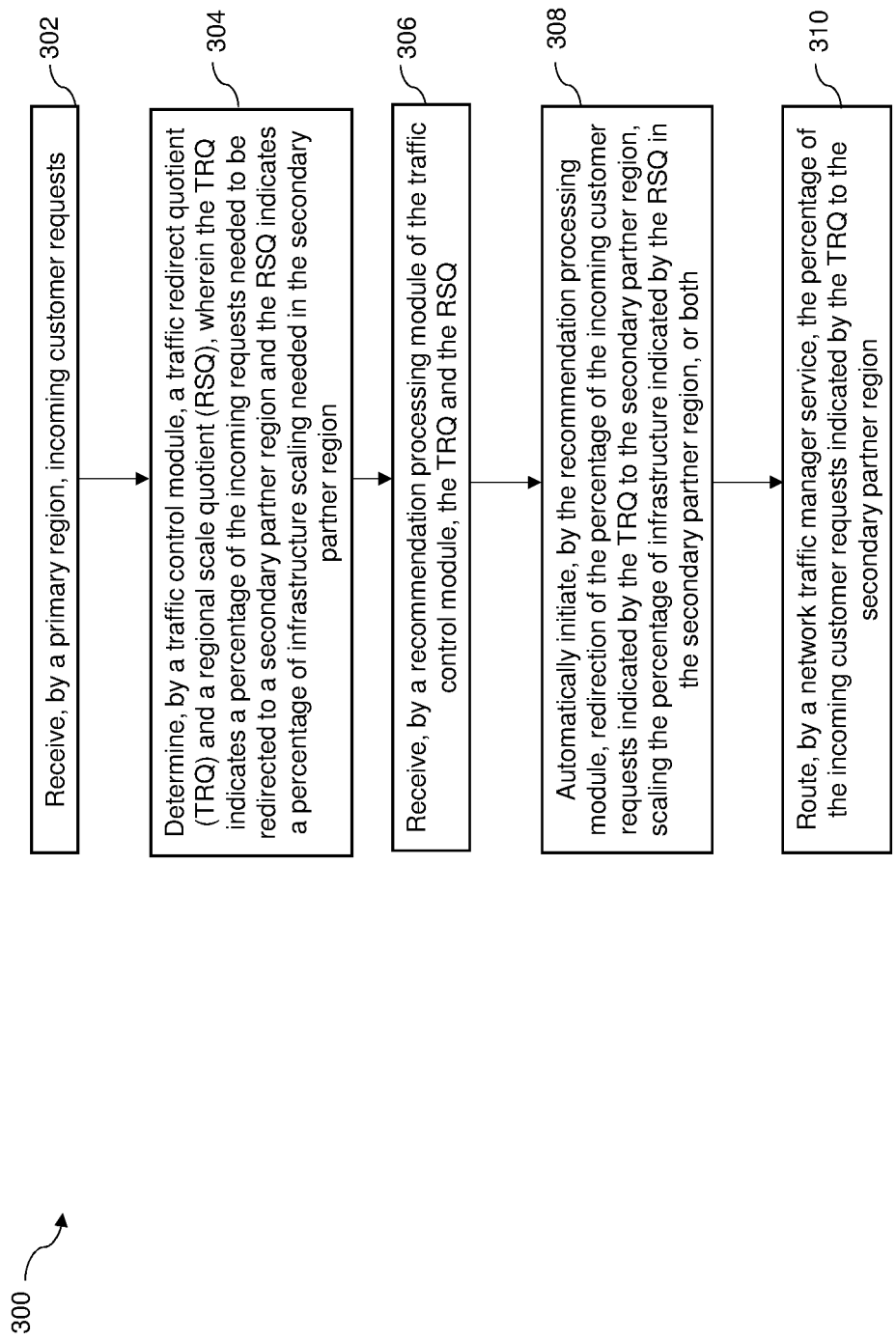
FIG. 3 is a flowchart of a method according to embodiments of the present disclosure.

Referring now to FIG. 3, a method 300 according to various embodiments of the present disclosure is described. At step 302, Primary Region 105 receives customer traffic, for example, incoming customer requests.

At step 304, TC Module 120 (i.e., TRQ Processor 121 and RSQ Processor 123), determines a TRQ and a RSQ, wherein the TRQ indicates a percentage of the incoming customer requests needed to be redirected to Secondary Partner Region 110 and the RSQ indicates a percentage of infrastructure scaling needed in Secondary Partner Region 110.

Figure 4:
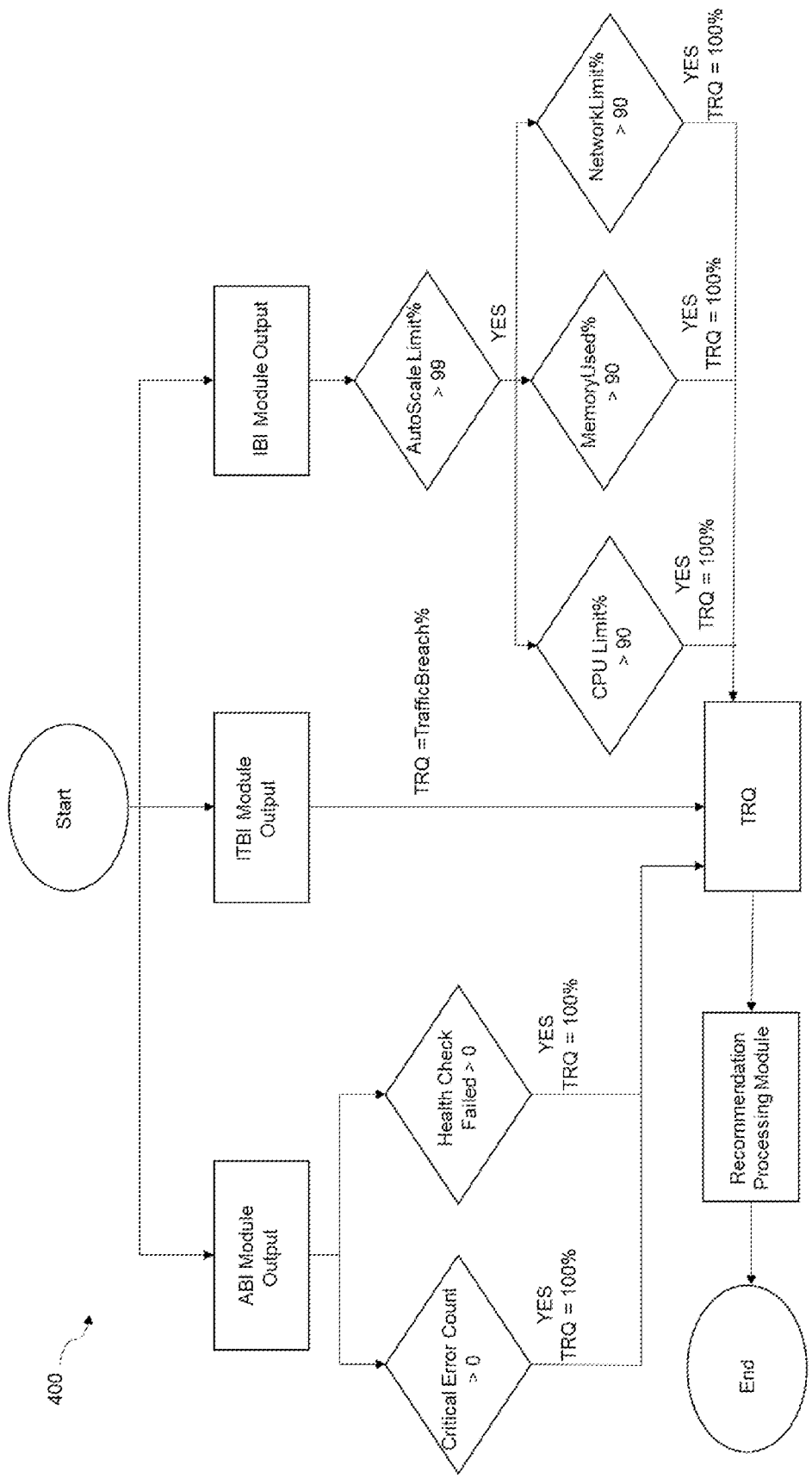
FIG. 4 is an exemplary flowchart for calculation of a traffic redirect quotient (TRQ) according to embodiments of the present disclosure.

FIG. 4 illustrates an exemplary flowchart 400 for calculation of TRQ. According to various embodiments, IBI Module 122 determines a plurality of infrastructure-related metrics, ITBI Module 124 calculates a percentage of traffic load breach, and ABI Module 126 determines a number of critical errors, a percentage of leading errors, and the health of an application. In one or more embodiments, the plurality of infrastructure-related metrics include a percentage of automatic scaling used, a percentage of CPU used, a percentage of memory used, and a percentage of network used.

In some embodiments, the plurality of infrastructure-related metrics, the percentage of traffic load breach, the number of critical errors, the percentage of leading errors, and the health of the application are uploaded to Cache 129. In certain embodiments, the uploading is constant or continuous. In several embodiments, the plurality of infrastructure-related metrics, the percentage of traffic load breach, the number of critical errors, the percentage of leading errors, and the health of the application are retrieved from Cache 129 when determining TRQ. The retrieving, in some embodiments, is constant or continuous.

At step 306, RP Module 128 receives the TRQ and the RSQ.

At step 308, RP Module 128 automatically initiates redirection of the percentage of the incoming customer requests indicated by the TRQ to Secondary Partner Region 110, scaling the percentage of infrastructure indicated by RSQ in Secondary Partner Region 110, or both.

At step 310, a network traffic manager, e.g., Global Accelerator 115, routes the percentage of the incoming customer requests indicated by TRQ to Secondary Partner Region 110.

As can be seen in FIG. 4, in some embodiments, TRQ is determined to be equal to the percentage of the traffic load breach. In other embodiments, TRQ is determined to be 100% when any of the following conditions are met: (1) the number of critical errors is greater than zero or (2) there is a health check failure. In yet other embodiments, TRQ is determined to be 100% when the percentage of automatic scaling is greater than 99%, and the percentage of CPU used, the percentage of memory used, or the percentage of network used in greater than a threshold value. The threshold value may be any value selected by a user, and is configurable. In FIG. 4, the threshold value is pre-selected as 90%.

In various embodiments, a configurable minimum percentage of infrastructure scaling for Secondary Partner Region 110 is established. Instead of keeping infrastructure in the Secondary Partner Region 110 entirely scaled, smart autoscaling is used based on various risk factors in Primary Region 105.

Figure 5:
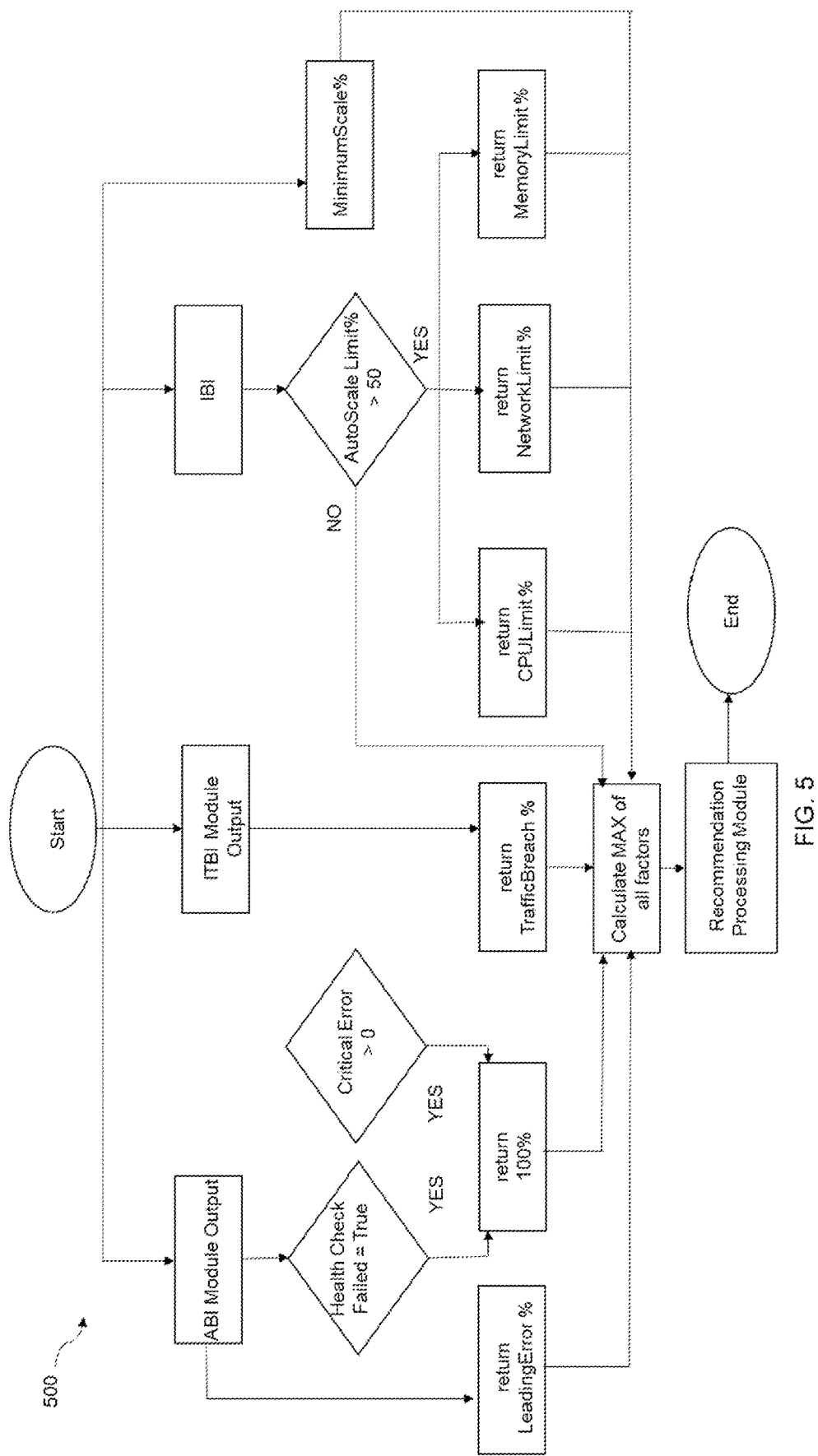
FIG. 5 is an exemplary flowchart for calculation of a regional scale quotient (RSQ) according to embodiments of the present disclosure.

FIG. 5 illustrates an exemplary flowchart 500 for calculation of RSQ. As seen in FIG. in some embodiments, RSQ is determined to be 100% when the number of critical errors is greater than zero, or when there is a health check failure. In some embodiments, RSQ is determined to be a maximum of (1) the minimum percentage of infrastructure scaling for Secondary Partner Region 110; (2) the percentage of automatic scaling used; (3) the percentage of leading errors; (4) the percentage of traffic load breach; or when the percentage of autoscaling has crossed a threshold (e.g., 50%), the percentage of CPU used, the percentage of memory used, or the percentage of network used. The threshold value may be any value selected by a user, and is configurable.

Figure 6:
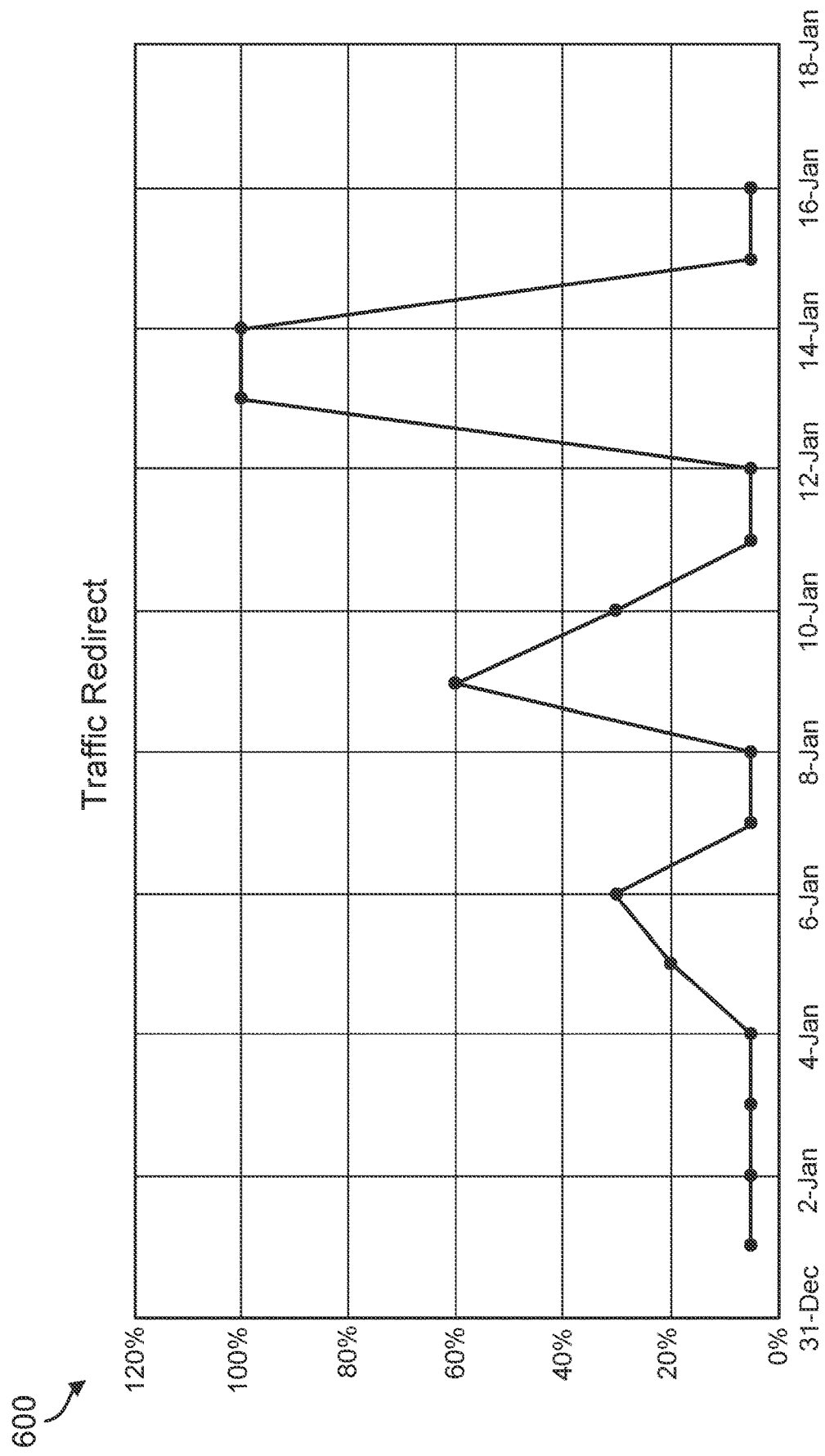
FIG. 6 illustrates a sample TRQ graph according to embodiments of the present disclosure.

FIG. 6 shows a sample TRQ graph 600 indicating the percentage of customer traffic that was handled by Secondary Partner Region 110. From January 1-4, 5% of the traffic was handled by Secondary Partner Region 110. On January 13-14, 100% of the traffic was handled by Secondary Partner Region 110. Once Primary Region 105 recovered, the traffic was restored to Primary Region 105. The TRQ, as calculated according to various embodiments, has been put together pictorially in the graph 600. The graph 600 shows historical TRQ data over a date-time range. The peaks in the graph 600 indicate the percentage of traffic that was redirected to Secondary Partner Region 110 to main high availability according to an embodiment of the present disclosure.

Figure 7:
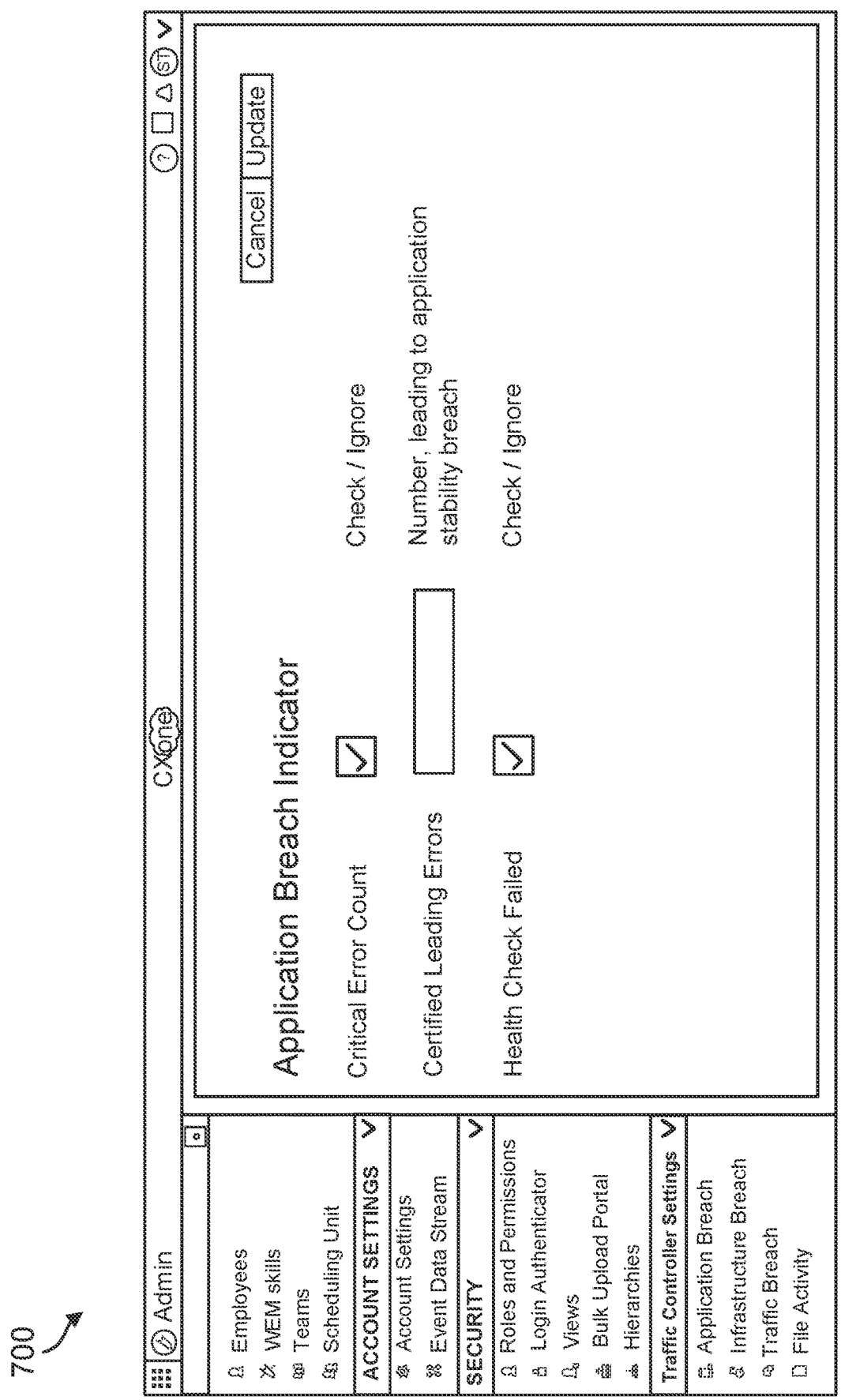
FIG. 7 illustrates an exemplary user interface that accepts default configurations for the application breach indicator (ABI) module according to embodiments of the present disclosure.

FIG. 7 illustrates a user interface 700 that accepts default configurations for ABI Module 126. Based on inputs received from a user, the outputs for ABI Module 126 are calculated. This helps set the custom default thresholds on application usage.

Figure 8:
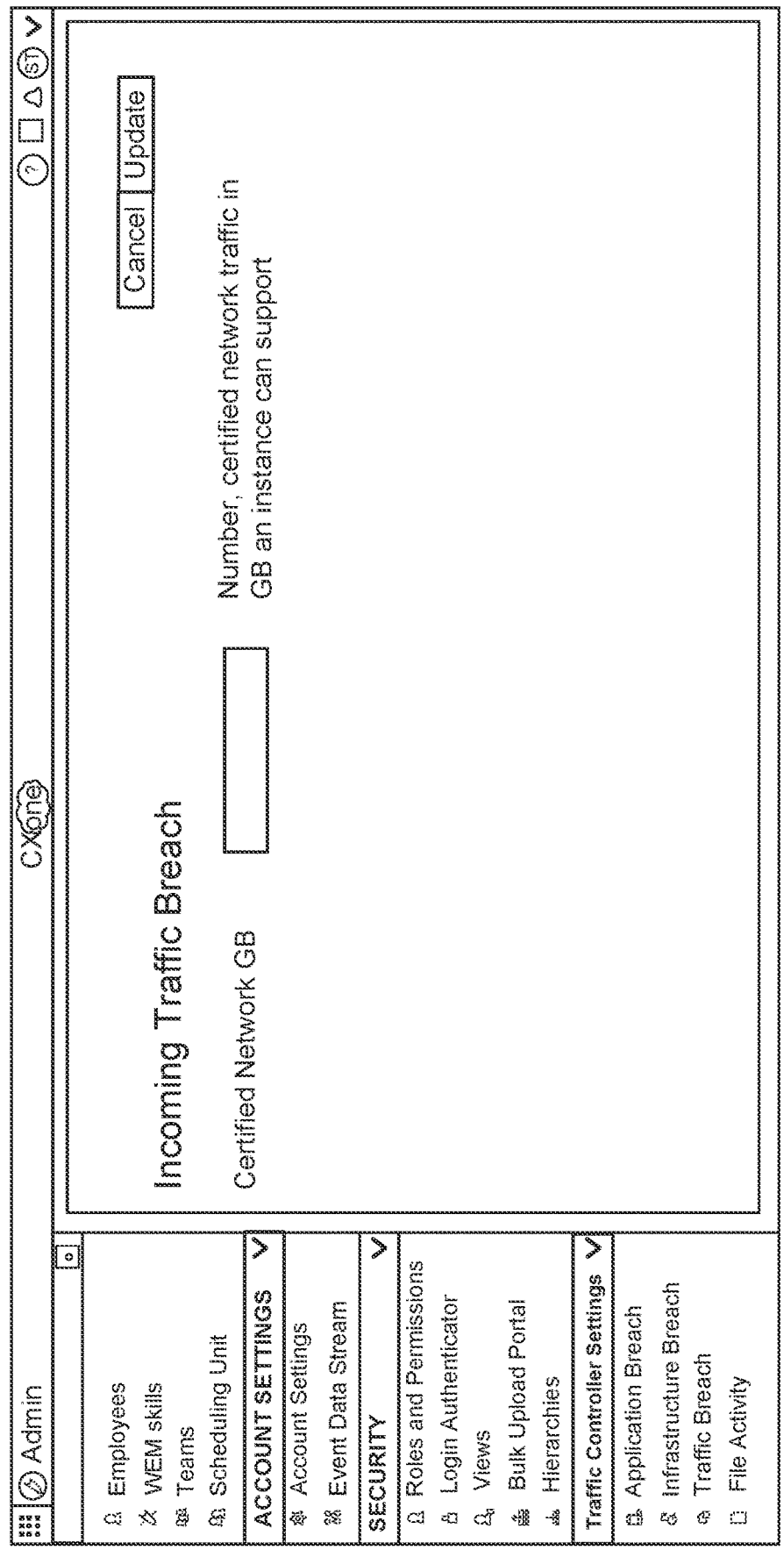
FIG. 8 illustrates an exemplary user interface that accepts default configurations for the incoming traffic breach indicator (ITBI) module according to embodiments of the present disclosure.

FIG. 8 illustrates a user interface 800 that accepts default configurations for ITBI Module 124. Based on inputs received from a user, the outputs for ITBI Module 124 are calculated. Users can set up custom values based on the type of server they are using.

Figure 9:
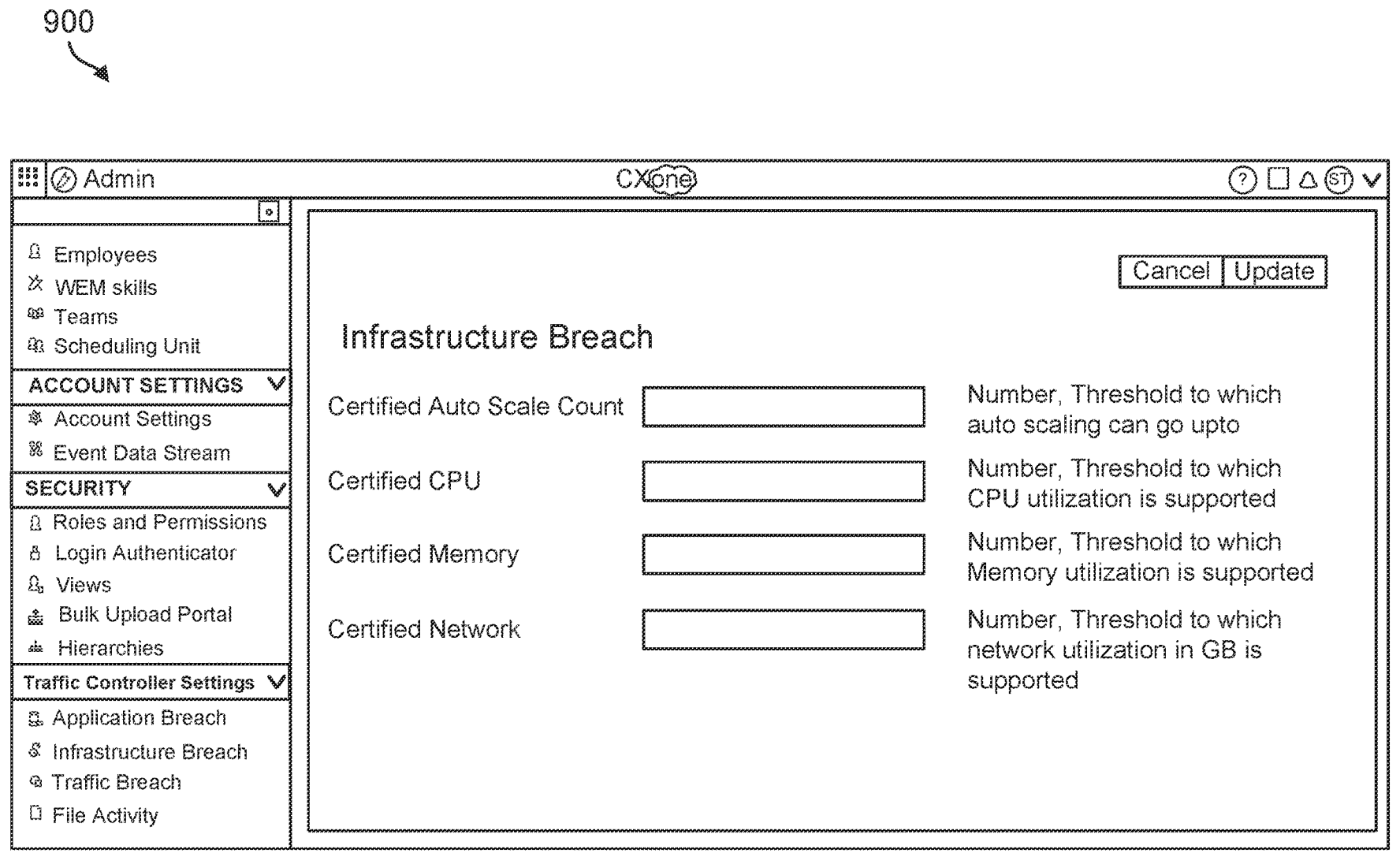

FIG. 9 illustrates a user interface 900 that accepts default configuration settings for IBI Module 122. Based on inputs received from a user, the outputs for IBI Module 122 are calculated. Applications can have different certified auto scale counts based on fair usage, CPU, memory, and network values depend on the type of service on which the application is hosted.

FIG. 10 illustrates TRQ results of a simulation that was run. In the first case, the CriticalErrorCount indicator is greater than zero, which causes the TRQ to be 100%. In the second case, the HealthCheckFailed indicator is TRUE, which causes the TRQ to be 100%. In the third case, the AutoScaleUsed% indicator limit was reached and the CPUUsed% indicator exceeded the threshold, so TRQ is determined to be 100%. In the fourth case, the AutoScaleUsed% indicator limit was reached and the MemoryUsed% indicator exceeded the threshold, so TRQ is determined to be 100%. In the fifth case, the AutoScaleUsed% indicator limit was reached and the NetworkUsed% indicator exceeded the threshold, so the TRQ is determined to be 100%. In the sixth case, the TrafficBreach% indicator is the TRQ since the CriticalErrorCount indicator is not greater than one, the HealthCheckFailed indicator is FALSE, and the AutoScaleUsed% indicator has not reached its limit. In the seventh case, no traffic redirection is needed since the CriticalErrorCount indicator is not greater than one, the HealthCheckFailed indicator is FALSE, the AutoScaleUsed% indicator limit was not reached, and the TrafficBreach% indicator was 0%. The TRQ in the seventh case is 0%.

FIG. 11 illustrates RSQ results of a simulation that was run. In the first case, the maximum value of the MinimumScale% indicator is used as the RSQ because all the other indicators are normal. In the second case, the maximum value of the LeadingError% indicator is used as the RSQ because it was higher than the MinimumScale% indicator. In the third case, the AutoScaleUsed% indicator was used as the RSQ because it was higher than the LeadingError% indicator. In the fourth case, the AutoScaleUsed% indicator crossed the threshold of 70%, and the CPUUSed% indicator was higher so the CPUUsed% indicator was used as the RSQ. In the fifth case, the AutoScaleUsed% indicator crossed the threshold of 70%, and the NetworkUsed% indicator was higher so the NetworkUsed% indicator was used as the RSQ. In the sixth case, the CriticalErrorCount indicator was greater than zero, so the RSQ was 100%. In the seventh case, both the CriticalErrorCount indicator was greater than zero and the HealthCheckFailed indicator was TRUE so the RSQ was 100%.

Figure 12:
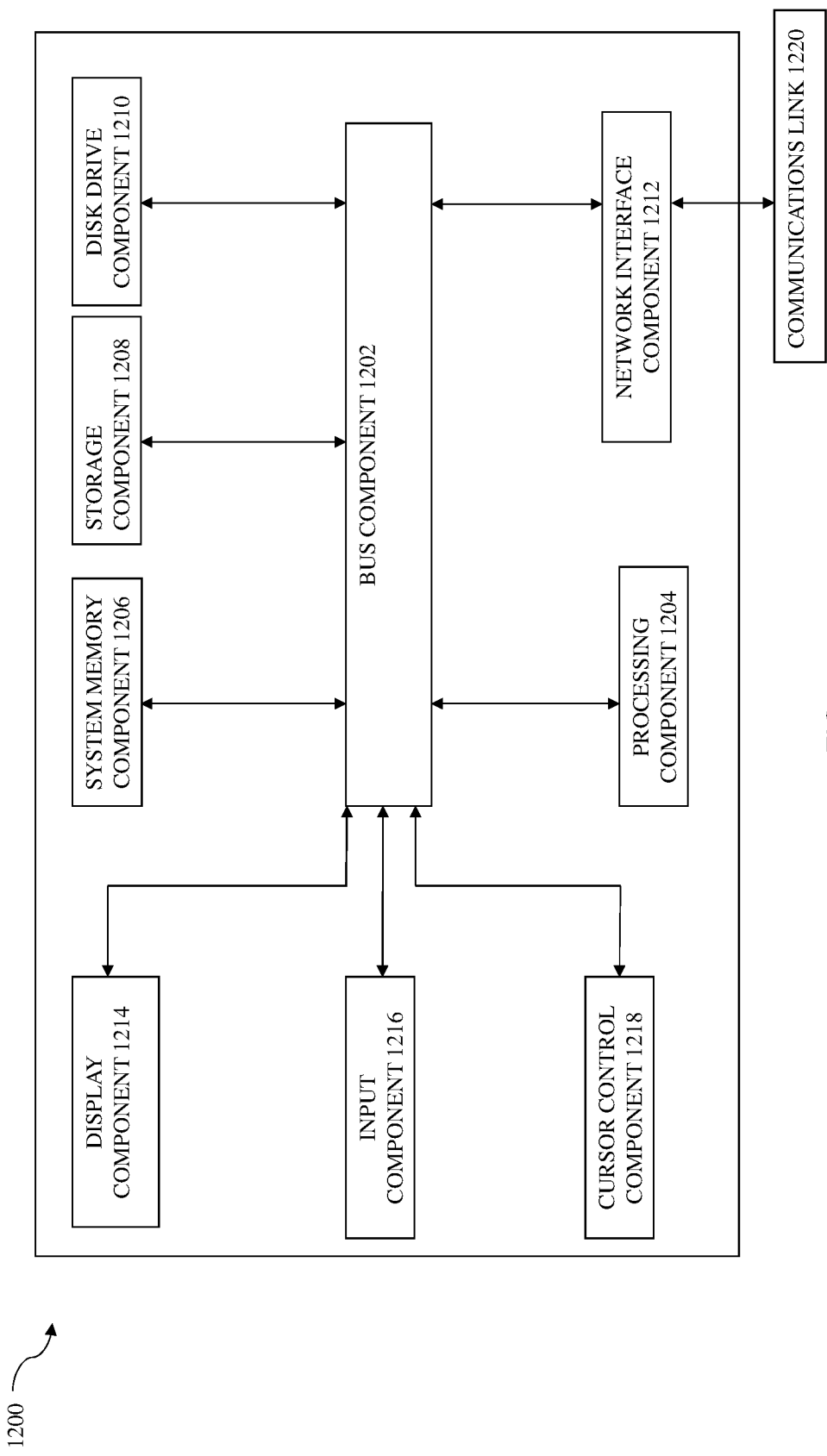
FIG. 12 is a block diagram of a computer system suitable for implementing one or more components in FIG. 1 according to one embodiment of the present disclosure.

Referring now to FIG. 12, illustrated is a block diagram of a system 1200 suitable for implementing embodiments of the present disclosure. System 1200, such as part of a computer and/or a network server, includes a bus 1202 or other communication mechanism for communicating information, which interconnects subsystems and components, including one or more of a processing component 1204 (e.g., processor, micro-controller, digital signal processor (DSP), etc.), a system memory component 1206 (e.g., RAM), a static storage component 1208 (e.g., ROM), a network interface component 1212, a display component 1214 (or alternatively, an interface to an external display), an input component 1216 (e.g., keypad or keyboard), and a cursor control component 1218 (e.g., a mouse pad).

In accordance with embodiments of the present disclosure, system 1200 performs specific operations by processor 1204 executing one or more sequences of one or more instructions contained in system memory component 1206. Such instructions may be read into system memory component 1206 from another computer readable medium, such as static storage component 1208. These may include instructions to receive, by a primary region, incoming customer requests; determine, by a traffic control module, a traffic redirect quotient (TRQ) and a regional scale quotient (RSQ), wherein the TRQ indicates a percentage of the incoming customer requests needed to be redirected to a secondary partner region and the RSQ indicates a percentage of infrastructure scaling needed in the secondary partner region; receive, by a recommendation processing module, the TRQ and the RSQ; automatically initiate, by the recommendation processing module, redirection of the percentage of the incoming customer requests indicated by the TRQ to the secondary partner region, scale the percentage of infrastructure indicated by the RSQ in the secondary partner region, or both; and route, by a network traffic manager service, the percentage of the incoming customer requests indicated by the TRQ to the secondary partner region. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 1204 for execution. Such a medium may take many forms, including but not limited to, non-volatile media, volatile media, and transmission media. In various implementations, volatile media includes dynamic memory, such as system memory component 1206, and transmission media includes coaxial cables, copper wire, and fiber optics, including wires that comprise bus 1202. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 1200. In various other embodiments, a plurality of systems 1200 coupled by communication link 1220 (e.g., LAN, WLAN, PTSN, or various other wired or wireless networks) may perform instruction sequences to practice the disclosure in coordination with one another. Computer system 1200 may transmit and receive messages, data, information and instructions, including one or more programs (i.e., application code) through communication link 1220 and communication interface 1212. Received program code may be executed by processor 1204 as received and/or stored in disk drive component 1210 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A traffic routing and infrastructure scaling system comprising:
   a processor and a computer readable medium operably coupled thereto, the computer readable medium comprising a plurality of instructions stored in association therewith that are accessible to, and executable by, the processor, to perform operations which comprise:
   receiving, by a primary region, incoming customer requests;
   determining, by a traffic control module, a traffic redirect quotient (TRQ) and a regional scale quotient (RSQ), wherein the TRQ indicates a percentage of the incoming customer requests needed to be redirected to a secondary partner region and the RSQ indicates a percentage of infrastructure scaling needed in the secondary partner region;
   receiving, by a recommendation processing module, the TRQ and the RSQ;
   automatically initiating, by the recommendation processing module, redirection of the percentage of the incoming customer requests indicated by the TRQ to the secondary partner region, scaling the percentage of infrastructure indicated by the RSQ in the secondary partner region, or both; and
   routing, by a network traffic manager service, the percentage of the incoming customer requests indicated by the TRQ to the secondary partner region.

2. The traffic routing and infrastructure scaling system of claim 1, wherein the operations further comprise:
   determining, by an infrastructure breach indicator (IBI) module, a plurality of infrastructure-related metrics;
   calculating, by an incoming traffic breach indicator (ITBI) module, a percentage of traffic load breach; and
   determining, by an application breach indicator (ABI) module, a number of critical errors, a percentage of leading errors, and health of an application.

3. The traffic routing and infrastructure scaling system of claim 2, wherein the operations further comprise uploading the plurality of infrastructure-related metrics, the percentage of traffic load breach, the number of critical errors, the percentage of leading errors, and the health of the application to a cache.

4. The traffic routing and infrastructure scaling system of claim 3, wherein determining the TRQ and RSQ comprises retrieving, from the cache, the plurality of infrastructure-related metrics, the percentage of traffic load breach, the number of critical errors, the percentage of leading errors, and the health of the application.

5. The traffic routing and infrastructure scaling system of claim 4, wherein the TRQ is determined to be equal to the percentage of the traffic load breach.

6. The traffic routing and infrastructure scaling system of claim 5, wherein the RSQ is determined to be 100% when the number of critical errors is greater than zero, or when there is a health check failure.

7. The traffic routing and infrastructure scaling system of claim 6, wherein the plurality of infrastructure-related metrics comprise a percentage of automatic scaling used, a percentage of central processing unit (CPU) used, a percentage of memory used, and a percentage of network used.

8. The traffic routing and infrastructure scaling system of claim 7, wherein the TRQ is determined to be 100% when:
the number of critical errors is greater than zero; or
there is a health check failure; or
the percentage of automatic scaling is greater than 99% and the percentage of CPU used, the percentage of memory used, or the percentage of network used is greater than a threshold value.

9. The traffic routing and infrastructure scaling system of claim 7, wherein the operations further comprise establishing a minimum percentage of infrastructure scaling for the secondary partner region.

10. The traffic routing and infrastructure scaling system of claim 9, wherein the RSQ is determined to be a maximum of:
the minimum percentage of infrastructure scaling for the secondary partner region;
the percentage of automatic scaling used;
the percentage of leading errors;
the percentage of traffic load breach; or
when the percentage of autoscaling has crossed a threshold:
the percentage of CPU used,
the percentage of memory used, or
the percentage of network used.

11. A method for traffic routing and infrastructure scaling, which comprises:
receiving, by a primary region, incoming customer requests;
determining, by a traffic control module, a traffic redirect quotient (TRQ) and a regional scale quotient (RSQ), wherein the TRQ indicates a percentage of the incoming customer requests needed to be redirected to a secondary partner region and the RSQ indicates a percentage of infrastructure scaling needed in the secondary partner region;
receiving, by a recommendation processing module, the TRQ and the RSQ;
automatically initiating, by the recommendation processing module, redirection of the percentage of the incoming customer requests indicated by the TRQ to the secondary partner region, scaling the percentage of infrastructure indicated by the RSQ in the secondary partner region, or both; and
routing, by a network traffic manager service, the percentage of the incoming customer requests indicated by the TRQ to the secondary partner region.

12. The method of claim 11, which further comprises:
determining, by an infrastructure breach indicator (IBI) module, a plurality of infrastructure-related metrics;
calculating, by an incoming traffic breach indicator (ITBI) module, a percentage of traffic load breach; and
determining, by an application breach indicator (ABI) module, a number of critical errors, a percentage of leading errors, and health of an application.

13. The method of claim 12, which further comprises:
uploading the plurality of infrastructure-related metrics, the percentage of traffic load breach, the number of critical errors, the percentage of leading errors, and the health of the application to a cache, and
wherein determining the TRQ and RSQ comprises retrieving, by the traffic control module from the cache, the plurality of infrastructure-related metrics, the percentage of traffic load breach, the number of critical errors, the percentage of leading errors, and the health of the application.

14. The method of claim 13, wherein the plurality of infrastructure-related metrics comprise a percentage of automatic scaling used, a percentage of central processing unit (CPU) used, a percentage of memory used, and a percentage of network used.

15. The method of claim 14, wherein the TRQ is determined to be 100% when:
the number of critical errors is greater than zero; or
there is a health check failure; or
the percentage of automatic scaling is greater than 99% and the percentage of CPU used, the percentage of memory used, or the percentage of network used is greater than a threshold value.

16. The method of claim 14, which further comprises establishing a minimum percentage of infrastructure scaling for the secondary partner region, and wherein the RSQ is determined to be a maximum of:
the minimum percentage of infrastructure scaling for the secondary partner region;
the percentage of automatic scaling used;
the percentage of leading errors;
the percentage of traffic load breach; or
when the percentage of autoscaling has crossed a threshold:
the percentage of CPU used,
the percentage of memory used, or
the percentage of network used.

17. A non-transitory computer-readable medium having stored thereon computer-readable instructions executable by a processor to perform operations which comprise:
receiving, by a primary region, incoming customer requests;
determining, by a traffic control module, a traffic redirect quotient (TRQ) and a regional scale quotient (RSQ), wherein the TRQ indicates a percentage of the incoming customer requests needed to be redirected to a secondary partner region and the RSQ indicates a percentage of infrastructure scaling needed in the secondary partner region;
receiving, by a recommendation processing module, the TRQ and the RSQ;
automatically initiating, by the recommendation processing module, redirection of the percentage of the incoming customer requests indicated by the TRQ to the secondary partner region, scaling the percentage of infrastructure indicated by the RSQ in the secondary partner region, or both; and
routing, by a network traffic manager service, the percentage of the incoming customer requests indicated by the TRQ to the secondary partner region.

18. The non-transitory computer-readable medium of claim 17, wherein the operations further comprise:
- determining, by an infrastructure breach indicator (IBI) module, a plurality of infrastructure-related metrics;
- calculating, by an incoming traffic breach indicator (ITBI) module, a percentage of traffic load breach; and
- determining, by an application breach indicator (ABI) module, a number of critical errors, a percentage of leading errors, and health of an application.

19. The non-transitory computer-readable medium of claim 18, wherein:
- the operations further comprise uploading the plurality of infrastructure-related metrics, the percentage of traffic load breach, the number of critical errors, the percentage of leading errors, and the health of the application to a cache, and
- determining the TRQ and RSQ comprises retrieving, from the cache, the plurality of infrastructure-related metrics, the percentage of traffic load breach, the number of critical errors, the percentage of leading errors, and the health of the application.

20. The non-transitory computer-readable medium of claim 19, wherein the plurality of infrastructure-related metrics comprise a percentage of automatic scaling used, a percentage of central processing unit (CPU) used, a percentage of memory used, and a percentage of network used.

* * * * *